Patented Nov. 17, 1936

2,061,184

UNITED STATES PATENT OFFICE 2,061,184

FOOD PRODUCT

Curtis B. Camp, Glencoe, Ill.

No Drawing. Application April 10, 1931,
Serial No. 529,297

4 Claims. (Cl. 99—83)

This invention relates to food products and particularly to food products comprising bran in substantial amount.

Bran is extensively used as human food or as a supplementary ration, particularly on account of its laxative effect. Bran, as a human food, is subject to serious objections. One objection is that it is unpalatable to most people particularly on account of it being naturally tough or wiry. Further, while bran contains large amounts of nitrogenous and carbohydrate materials, they appear to be largely incapable of being assimilated by the human system.

Among the objects of the invention is to overcome these objections and to convert bran into a palatable food which can be eaten directly or used in the baking of bread products.

I have discovered that milk of magnesia exerts remarkable effects upon bran, which results in improved appearance, improved palatability and improved assimilation. I have discovered that mineral oil, particularly the so-called white oils, may be incorporated with the bran and milk of magnesia and that a product may thereby be produced which is non-oily to the touch and may be packed in paper containers for transportation and sale.

Bran has certain objections as a laxative that are corrected by the cooperative effect of the milk of magnesia and white oil. One of these objections is the sharp wiry edges of the bran particles which cause the bran to stick or cling to the intestines. These edges, as a result of their sharp wiry character, may also scratch or lacerate the wall of the intestines, thereby creating serious intestinal disorders. These objections are entirely eliminated by the action of the milk of magnesia which curls the edges of the bran particles into scroll-like formations. In this changed form all tendency of the bran particles to stick or adhere to the walls of the intestines, or to scratch or lacerate the delicate tissues is overcome.

Another objection to bran as a laxative is the fact that it absorbs moisture in large quantities while in the intestines, which is conducive to a dryness therein instead of a lubricating action. The presence of the mineral oil in the bran prevents it from absorbing moisture to a considerable extent and causes it to give off oil which lubricates and aids elimination.

The bran acts as a vehicle for the oil and insures its becoming mixed with the food and lubricating the walls of the intestines, which is not always the case where the oil is taken alone.

By the use of bran, mineral oil and milk of magnesia, in accordance with my invention, it will be seen that I overcome the objection to oil when used alone, that I overcome both objections inherent in the use of bran, and that I produce a substantially dry food product that may be packed and shipped as other dry cereals, and one that is changed in the shape and appearance of its particles, and that has all the advantages and none of the defects of the separate elements of my combination when used alone.

The milk of magnesia appears to soften the bran and removes the wiry feel or taste which is so objectionable in bran products. This improvement persists after the product is dried and rendered water free. The sharp wiry edges of the bran appear to be curled up or removed by this treatment.

The invention will be readily understood from the following examples:

*Example I.*—I take 1 pint of bran, and add thereto about 4 teaspoons of milk of magnesia. The amount of milk of magnesia may vary within wide limits. It should preferably be sufficient so that all the bran is moistened and the milk of magnesia distributed all over the bran particles. The mixture may then be dried in any suitable manner. The reddish color of the bran is changed to a light gray color, the rough edges of the bran are curled up or removed altering its appearance, and the palatability and ease of mastication of the bran are remarkably enhanced.

*Example II.*—I take 1 pint of bran, and add thereto four teaspoons of white oil and four teaspoons of milk of magnesia. The liquid ingredients may be added simultaneously or successively. I prefer to mix the white oil with the bran and distribute it through the bran particles before adding the milk of magnesia. After adding the milk of magnesia, the product is dried and is ready for sale. The milk of magnesia rolls up the bran particles and removes the wiry taste of the bran, obscures all appearance of oiliness, and makes the bran more tender, greatly enhancing the ease of mastication. The product appears darker than the initial bran. The amount of oil and milk of magnesia specified is intended to be exemplary only, since it may be varied within wide limits.

My bran products may be eaten as a breakfast food with cream and sugar or they may be used to make bran breads, such as muffins, cookies and cakes. The baking qualities are much better than those of natural bran and no other flour is required to produce coherent breads of satisfactory texture. Most bran bread recipes may be employed, omitting the flour altogether and reducing the other ingredients in proportion.

It will be understood that the bran employed may be cooked or uncooked and that the product may be subjected to subsequent treatment such as toasting.

Having thus described my invention, what I claim as new and desire to secure by Letters Patent, is:

1. The method of transforming the appearance and character of bran as a laxative, and improving the edibility thereof, which consists in intimately treating the bran particles with milk of magnesia, and drying the mixture.

2. A substantially dry food product comprising bran treated with milk of magnesia and thereby having its edges rolled up and its edibility and laxative characteristics improved.

3. A substantially dry food product comprising bran treated with milk of magnesia and mineral oil and thereby having its edges rolled up and its edibility and laxative characteristics improved.

4. The method of transforming the appearance and character of bran as a laxative, and improving the edibility thereof, which consists in intimately treating the bran particles with milk of magnesia and white oil, and drying the mixture.

CURTIS B. CAMP.